United States Patent [19]

Kmiec

[11] Patent Number: 5,430,863
[45] Date of Patent: Jul. 4, 1995

[54] INTERFACE SYSTEM FOR COUPLING TWO COMPUTER ENVIRONMENTS

[75] Inventor: Slawomir A. Kmiec, Etobicoke, Canada

[73] Assignee: CEGAB Development Corp., Chicago, Ill.

[21] Appl. No.: 290,203

[22] Filed: Aug. 15, 1994

Related U.S. Application Data

[63] Continuation of Ser. No. 865,107, Apr. 8, 1992, abandoned.

[51] Int. Cl.$^6$ .................. G06F 13/00; G06F 15/16
[52] U.S. Cl. ................. 395/500; 364/927.98; 364/239
[58] Field of Search ............ 395/500, 800, 200

[56] References Cited

U.S. PATENT DOCUMENTS

| | | | |
|---|---|---|---|
| 4,281,315 | 7/1981 | Bauer | 364/DIG. 1 |
| 4,575,793 | 3/1986 | Morel et al. | 395/375 |
| 4,628,446 | 12/1986 | Hoffner | 364/DIG. 1 |

Primary Examiner—David Y. Eng
Attorney, Agent, or Firm—Dressler, Goldsmith, Shore & Milnamow

[57] ABSTRACT

A computer interface is provided for communication between a first computer environment and a second computer environment. The interface includes an input for receiving information from the first computer environment and an output for communicating information to the second computer environment. Information received from the first computer environment is stored in a memory for analysis. A plurality of predetermined rules are provided for translating information stored in the memory to a form compatible with the second computer environment. A loop routine is employed for sequentially testing whether a specific rule from the predetermined set of rules should be implemented. The loop routine includes a mechanism for identifying a subset of rules, from the predetermined set, which are to be executed in response to the received information. Each rule has associated with it an area of sensitivity, and a mechanism is provided to account for overlapping areas of sensitivity for different rules. The area of sensitivity for a specific rule is flagged when information received from the first computer environment impacts upon that area of sensitivity.

9 Claims, 7 Drawing Sheets

INTERFACE SYSTEM FOR COUPLING TWO COMPUTER ENVIRONMENTS

This application is a continuation of application Ser. No. 07/865,107, filed Apr. 8, 1992, now abandoned.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The present invention relates generally to an interface between a first computer environment and a second computer environment, and more specifically, to a system for logically translating information received from a first computer for use on a second computer.

BACKGROUND OF THE INVENTION

Since most mainframe computers are text-oriented, mainframe computer operators have communicated information (i.e. data and commands) to and from the mainframe computer through relatively unsophisticated cathode ray tube ("CRT") terminals. Such CRT terminals are connected either directly to the mainframe computer, or are connected remotely through a telephonic or other data transmission link. Through these "dumb" terminals, operators commonly send commands and other arguments to the mainframe through a command line displayed on the terminal. In most mainframe computer environments, more than one of these unsophisticated terminals can be connected for communication to the mainframe.

This form of communication between a mainframe computer and its operators suffers from a number of disadvantages. Primarily, due to the limited capabilities of the terminal (i.e. low resolution) and slow rate of information transmission, information received from the mainframe and displayed on the dumb terminal often appears in a cryptic format. Although certain software packages, such as Microsoft Corporation's Windows 3.0, include some rudimentary graphics, only characters and numerics are communicated to the program work area while the graphics appear as periphery.

The mainframe computer also dictates the format and type of information communicated to the operator. Thus, this type of user interface is not very "user friendly". Nor, due to the lack of software and hardware provided on the terminal, does the user have the option of customizing the user interface (i.e. the appearance of the display screen) to a visually or otherwise desirable format.

Moreover, in such a computer system, each mainframe computer and its associated CRT terminals are stand-alone entities. As such, the user interface of one mainframe computer can differ markedly from that of another mainframe computer. This results in a multiplicity of differing computer environments, each for a separate mainframe computer. As a consequence, a computer operator must learn multiple user interfaces in order to be proficient on various mainframe computers running different software packages. What is lacking is a generic or universal interface that can be used with many different mainframe computers.

A universal interface would allow an operator to communicate with a host of mainframe computers, each running separate programs, without having to use or learn a separate user interface for each computer. Additionally, a universal user interface will allow the operator to customize the graphical appearance of data received at his or her display.

With a universal computer interface, the prior dumb CRT terminals can be replaced by personal computers running interface software or using a hardware interface card. By employing a personal computer, the operator can benefit from the software and hardware included in such a device to make the user interface more user friendly. In addition, the operator can combine communication to and from a mainframe computer with other hardware or software applications accessible on the personal computer. Such a universal interface would also increase the power and performance of the personal computer by allowing easy access to a remote mainframe computer.

SUMMARY OF THE INVENTION

In view of the above, a computer interface is provided, which has an input device capable of receiving information from a first computer environment. Information received from the first computer environment is stored in a memory to be accessed by the interface. Included in the interface are a plurality of predetermined rules. Each rule is employed to logically translate information stored in the memory to a format compatible with a second computer environment. The interface includes a program containing a loop routine for selectively testing each of the predetermined rules, in response to the received information, to determine if any rule should be implemented. An output is provided for communicating the translated information to the second computer environment.

In a preferred embodiment of the invention, the loop routine is cycled to test for any rules necessary to be implemented and initiate the subroutines accompanying selected rules. In this embodiment, information received by the interface is stored in memory in the form of a virtual screen in the manner in which the information would be displayed on a CRT terminal. In the preferred embodiment, the first computer environment comprises a mainframe computer and the second computer environment comprises a personal computer.

In another aspect of the invention, a flagging routine is provided to optimize the loop routine. According to the invention, the flagging routine is provided for selecting a subset of rules from the predetermined set of rules which are to be implemented in response to the received information. In a preferred embodiment of the invention, the interface tests predetermined areas of sensitivity associated with each of the predetermined rules. Information received from the first computer environment is analyzed for its relation to any of the predetermined areas of sensitivity. If the information received requires any one of these rules to be implemented, its associated area of sensitivity is marked through the flagging routine. In the preferred embodiment, a count routine is also provided to account for overlapping areas of sensitivity for different rules.

These and other features and advantages of the invention will be further understood upon consideration of the following detailed description of the presently preferred embodiments of the invention, taken in conjunction with the appended drawings.

BRIEF DESCRIPTION OF THE DRAWINGS

FIG. 4(a) shows the correspondence between the virtual screen and flag screen, and FIG. 4(b) illustrates the areas of sensitivity associated with the various rules of the invention;

DETAILED DESCRIPTION OF THE PREFERRED EMBODIMENTS

Figure 1:
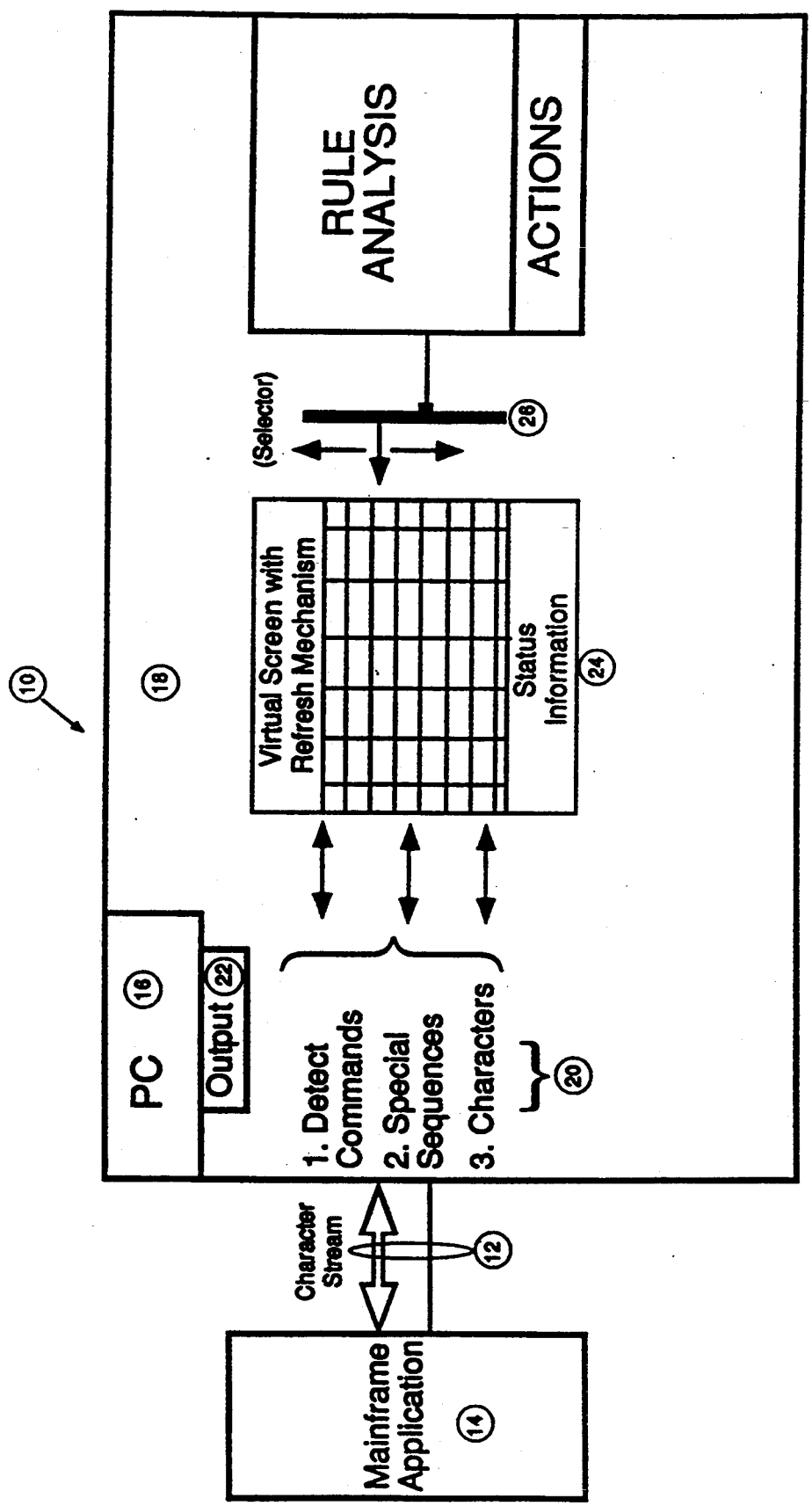
FIG. 1 is a block diagram of one presently preferred embodiment of the computer interface of the invention.

Referring to FIG. 1, what is shown is a block diagram of one presently preferred embodiment of the computer interface of the invention, generally designated at 10. As shown in FIG. 1, an input/output ("I/O") link 12 is provided to connect a first computer 14 with a second computer 16. In most embodiments, the operating environment of the first computer 14 is not compatible with that of the second computer 16. Alternatively, the graphical user interface of the second computer 16 may advantageously differ from the user interface of the first computer 14. Interposed between the remote computer 14 and the second computer 16, therefore, is the computer interface 18 of the invention.

As shown in FIG. 1, the computer interface 18 includes an input 20 to receive information from the first computer 14, and an output 22 to communicate translated information to the second computer 16 for display. In the preferred embodiment of FIG. 1, the first computer 14 comprises a mainframe computer and the second computer 16 comprises a personal computer or the like.

As those skilled in the art will appreciate, the computer interface 18 of the invention can be configured in many different computer environments without departing from the spirit and scope of the invention. For example, the second computer 16 can comprise a smart CRT terminal including resident hardware and software. The computer interface 18 can be additionally configured to facilitate communication between two mainframe computers, or to facilitate communication over a computer network such as a local area network. The computer interface 18 can, of course, be configured to communicate with another computer interface 18.

Included in FIG. 1, is a visual representation of the primary features of the computer interface 18. Commands and characters received at the input 20 of the computer interface 18 are communicated to, and stored in, a memory 24. As will be discussed in greater detail below, the commands and characters received are stored in a manner representative of their appearance on a display terminal coupled to the first computer 14. In the computer interface 18, the commands and characters received from the first computer 14 are not immediately displayed on any display device connected to the interface 18. Instead, the commands and characters stored in the memory 24 are first translated to a format compatible with the second computer 16. The ultimate format of the displayed information is dictated either by user preference or the requirements of the second computer environment.

Information stored in the memory 24 is thus stored in the form of a "virtual" screen. With a virtual screen, the computer interface 18 tests and analyzes the stored commands and characters, and translates this information into a format compatible with the second computer environment. Ultimately, after the received information is appropriately translated, it is communicated to the second computer 16 (i.e. to be displayed to the operator).

A visual representation of the "rule" analysis program employed with the computer interface 18 is also shown in FIG. 1. As illustrated, a selecting function is provided to selectively analyze the commands and characters appearing on the virtual screen stored in the memory 24. This selecting function comprises a loop routine in the preferred embodiment of the invention, and is graphically represented by the selector 26 shown in FIG. 1.

According to the loop routine, each location of the virtual screen stored in the memory 24 is analyzed to determine whether any information "displayed" in that section of the virtual screen needs to be translated. As further defined below, the determination of whether to translate any information stored in the memory 24 involves the execution of various rules preprogrammed into the computer interface 18. Implementing a rule involves both checking for the rule's applicability, and if applicable, performing the actions associated with that rule to translate the stored information for compatibility with the second computer environment.

In the preferred embodiment of the computer interface 18, a rule is defined as a logical unit of operation and any given rule may operate on information received and stored in the memory 24 in the form of the virtual screen. Conversely, each unit of information stored in the memory 24 can affect or implicate one or more rules provided in the computer interface 18. Thus, the computer interface 18 employs the predetermined set of rules to logically translate information received from one computer environment to a format compatible with a second computer environment.

As those skilled in the art will appreciate, a specific set of rules is not provided with the computer interface 18. Since the computer interface 18 is generic and universal to all computer environments, a specific set of rules, which are tailored to a specific application of the interface, must be developed for each such application of the interface. Each predetermined set of rules is thus developed by the operator or programmer of a specific computer to tailor the computer interface 18 to that specific computer environment. Accordingly, a tool kit is preferably provided with the computer interface 18 to allow programmers or operators to develop such rules for the particular computers connected to the computer interface 18.

Although defined as a logical unit of operation, a rule itself can involve many subtasks. In fact, a rule may initiate a subroutine to perform whatever operations are necessary to logically and physically translate the received information into a format compatible with the second computer environment. Thus, each rule is tailored to the particular needs of the computer environment and application programs to which the computer interface 18 is attached.

The computer interface 18, therefore, includes a facility to receive information communicated from the first computer 14. Information received at the input 20 is preferably coupled to a terminal emulation program included in the computer interface 18. Information received by the computer interface 18 is first directed to the terminal emulation program. The terminal emulator converts the received information to a format compatible with the interface, and then redirects the received information to the virtual screen stored in memory 24. As already mentioned, the information received by the terminal emulator is not displayed on any actual display screen in its received format.

The computer interface 18 next checks the predetermined set of rules to determine if and how to respond to the received information. The rules themselves perform the logical translation necessary to communicate the received information to the second computer environment. As described below, an optimization technique is employed in a preferred embodiment of the interface so that all rules are not always checked for every sequence of received information. Finally, the information translated by the respective rules is communicated to the second computer 16.

The computer interface 18 preferably also includes modules for hardware support and system optimization. In one alternate embodiment, hardware support modules are provided to receive input from either a mouse or an audio source. Thus, such modules facilitate support for devices not readily available on the first computer 14.

The preferred embodiment of the computer interface 18 also includes optimization techniques to reduce the amount of signal traffic over the I/O link 12. By limiting such traffic to and from the first computer 14 to essential data, the transaction bandwidth over the I/O link 12 is reduced to a minimum, thereby either reducing costs or allowing for additional applications (i.e. via additional rules) to be implemented on the computer interface 18, or speeding up the appearance of the first computer 14.

Figure 2:
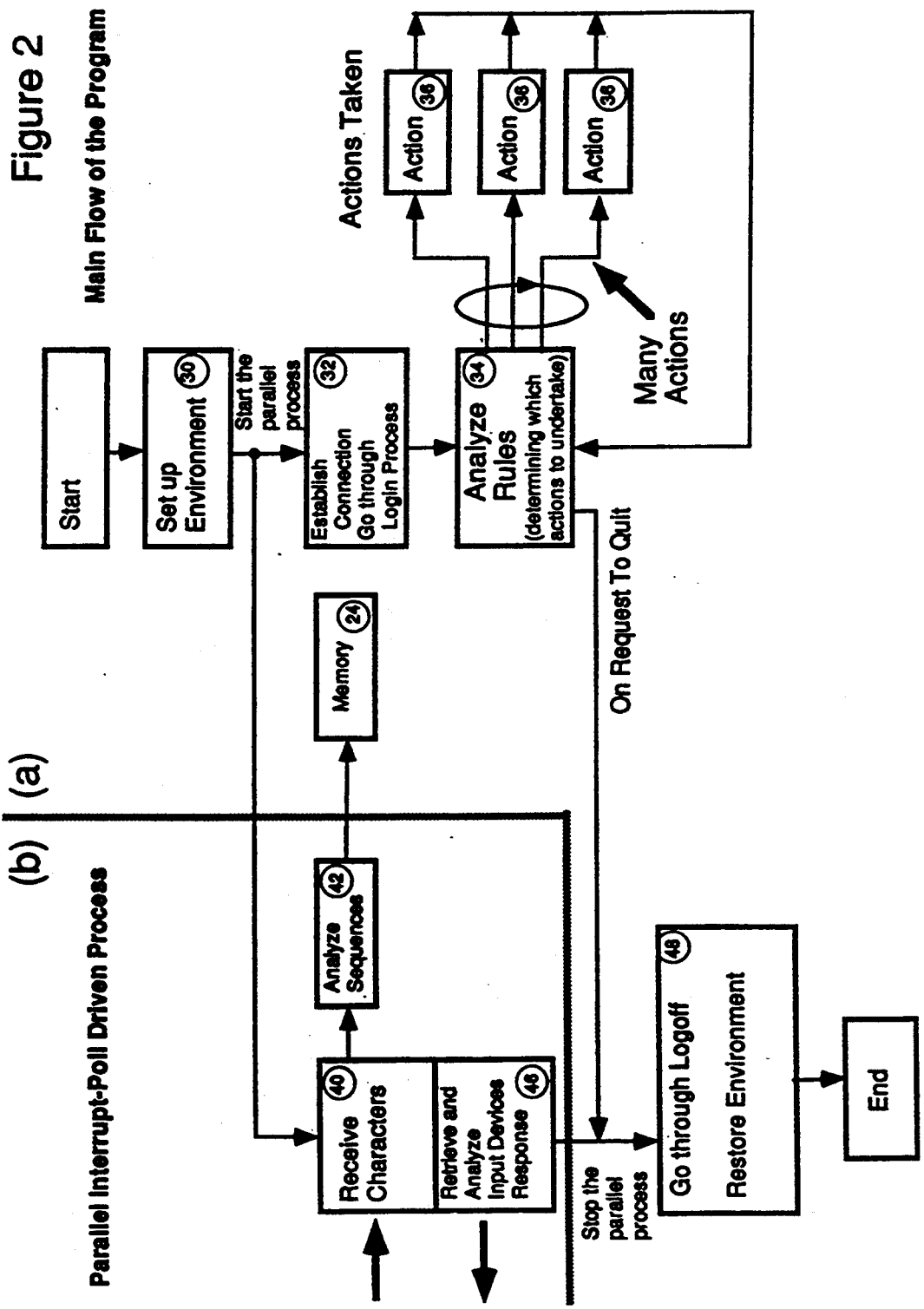
FIG. 2 is a flowchart of the routines performed by the computer interface of FIG. 1, where (a) shows the initialization of the interface and the loop routine, and (b) shows the communication routines performed at the front end of the interface.

Referring to FIG. 2, a flow chart of the routines performed in one presently preferred embodiment of the computer interface 18 is provided. As shown in FIG. 2(a), after start-up of the computer interface 18, the proper environment of the interface is set at step 30. This environment primarily includes initializing the terminal emulator for communication to the particular first computer environment. Connections are established to the first computer 14 and a log-in process is initiated at step 32. After the computer interface 18 has been initialized, the interface enters the loop routine at step 34. As mentioned above, the loop routine is provided in the interface to analyze which rules need to be implemented in response to information received from the first computer 14. Each rule is associated with an "action" 36, where each action performs the logical translation necessary to convert the information stored in the memory 24 to a format compatible with the second computer environment.

The flow chart shown in FIG. 2(b) illustrates the communication tasks performed at the front end of the computer interface 18. At step 40, characters are received at the input 20 coupled to the first computer 14. These character sequences are analyzed at step 42 and ultimately communicated through the terminal emulator described above to the memory 24. At step 46, a response is provided to the first computer 14 as a result of rule implementation, or the result of incorporating other sources of information (i.e. from a mouse or audio input) to be communicated to the first computer 14. Finally, a log-off routine is provided at step 48 and the proper environment of the interface is restored upon exiting communication with the first computer 14.

Figure 3:
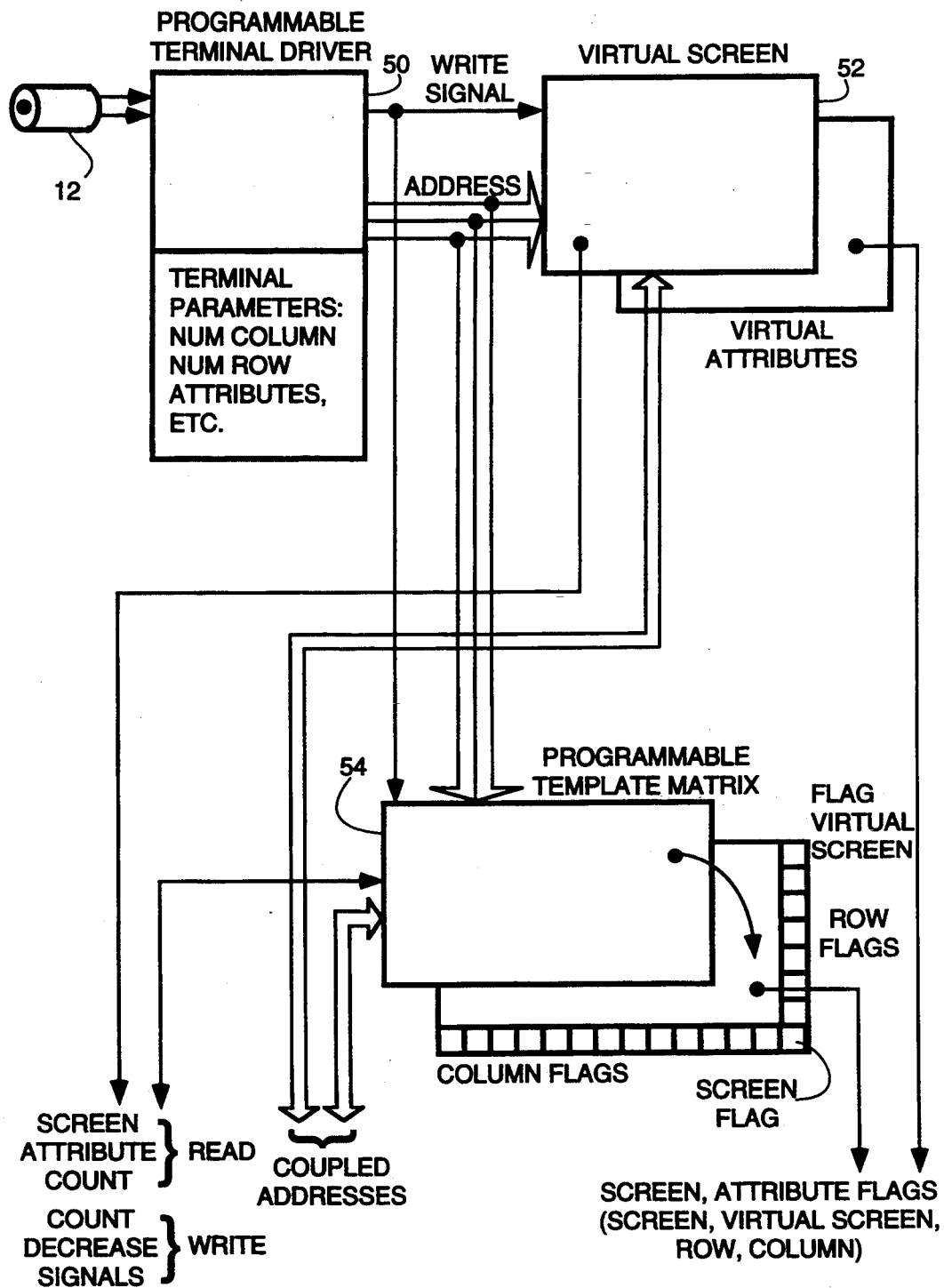
FIG. 3 is a hardware representation of the preferred computer interface of the invention.

A hardware representation of a preferred embodiment of the computer interface 18 is provided in FIG. 3. Information received from the first computer 14 is communicated over the I/O link 12 to a programmable terminal driver or terminal emulator 50. The terminal emulator 50 is employed to configure a personal computer to appear as a specific dumb terminal to the first computer 14 in a manner generally known in the art. Information received by the terminal emulator 50 is then stored in the form of a virtual screen 52 in a section of readable/writable memory. As described below, data is then transferred to a second memory-resident screen, or "flag" screen 54, which is employed to optimize the performance of the loop routine by reducing the subset of rules required to translate the received sequence of characters.

The flag screen 54 is employed in connection with a flagging routine to reduce the necessity for checking each and every rule in the predetermined set of rules in response to each sequence of characters received from the first computer 14. The loop routine scans the virtual screen 52 to determine if any rule needs to be implemented. Each rule, as it is checked by the loop routine, is preferably associated with a specific portion of the virtual screen 52. The flagging routine reduces the number of rules the loop routine must check by identifying only the various portions of the virtual screen 52 impacted by the received character sequence.

Figure 4:
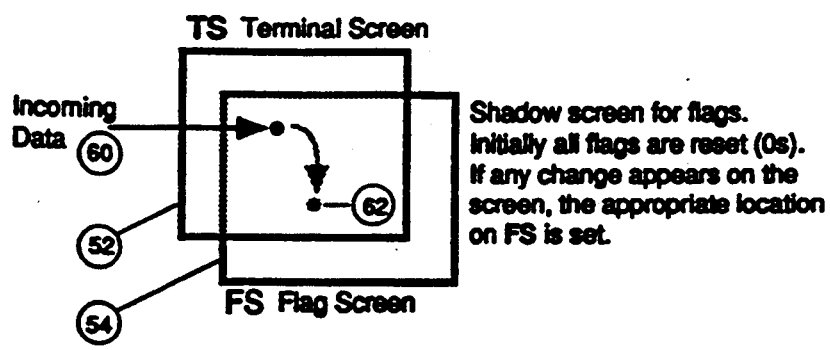
FIG. 4a and FIG. 4b illustrate the manner in which incoming data is stored and flagged in the preferred interface shown in FIG. 3, where
Figure 4:
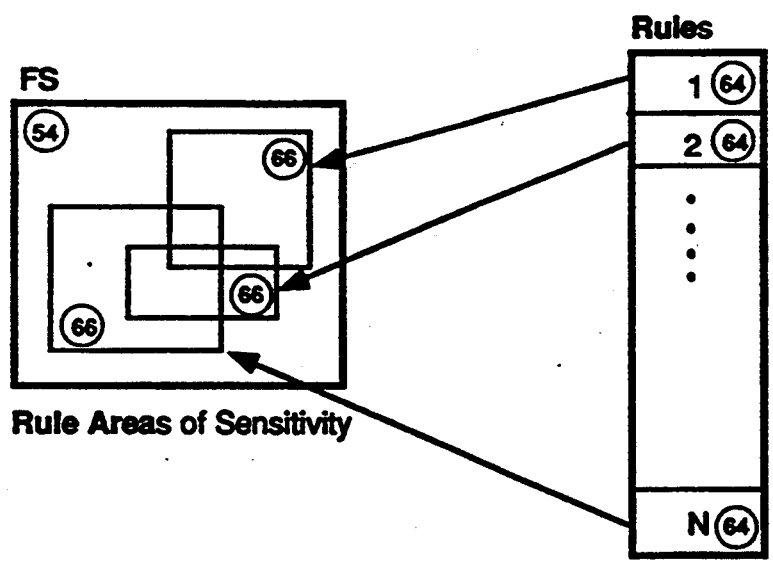

Referring to FIG. 4(a), incoming data 60 received from the terminal emulator 50 is stored in its appropriate location on the virtual screen 52. In response to the incoming data 60, a "flag" 62 is set on the flag screen 54 in an area corresponding to the placement of the incoming data 60 on the virtual screen 52. The flag screen 54 thus comprises a shadow screen for the virtual screen 52, and all the flags 62 of the flag screen 54 are initially cleared on reset of the computer interface 18. Since only certain areas of a display screen are affected at any given time by the incoming data 60, the flagging routine optimizes the loop routine to check only those areas currently implicated.

As shown in FIG. 4(b), each rule 64 is preferably associated with a specific area of sensitivity 66 on the flag screen 54. Constraining each rule to a specific area of sensitivity 66 is practicable since information displayed on a CRT terminal is usually associated with specific areas of the terminal screen in light of the function or purpose of that information. Since each rule 64 is preferably responsive to information that would be displayed in a specific area on a display screen, the flagging routine greatly increases the efficiency of the computer interface 18. By employing the flagging routine, only rules 64 associated with flagged areas of sensitivity 66 need be checked, rather than scanning the entire virtual screen 52 and implementing all of the rules 64. The areas of sensitivity 66 are thus preprogrammed along with the development of each rule 64, and each area of sensitivity 66 can take any shape or configuration desired.

Since areas of sensitivity 66 can have such random shapes, there exists the possibility that some areas of sensitivity 66 may overlap. The flagging routine takes into account the overlapping nature of the areas of sensitivity 66 and allows for prioritization of areas of sensitivity 66 that are to be analyzed first. Other methods for optimizing the loop routine can be employed, but are less preferred than the flagging routine. In one alternate embodiment, an area of the display screen can be copied to memory and compared periodically to determine whether it has changed. In a second alternate embodiment, a flag can be assigned to each pixel of a display screen, but such a solution would not allow for overlapping areas of sensitivity 66.

Figure 5:
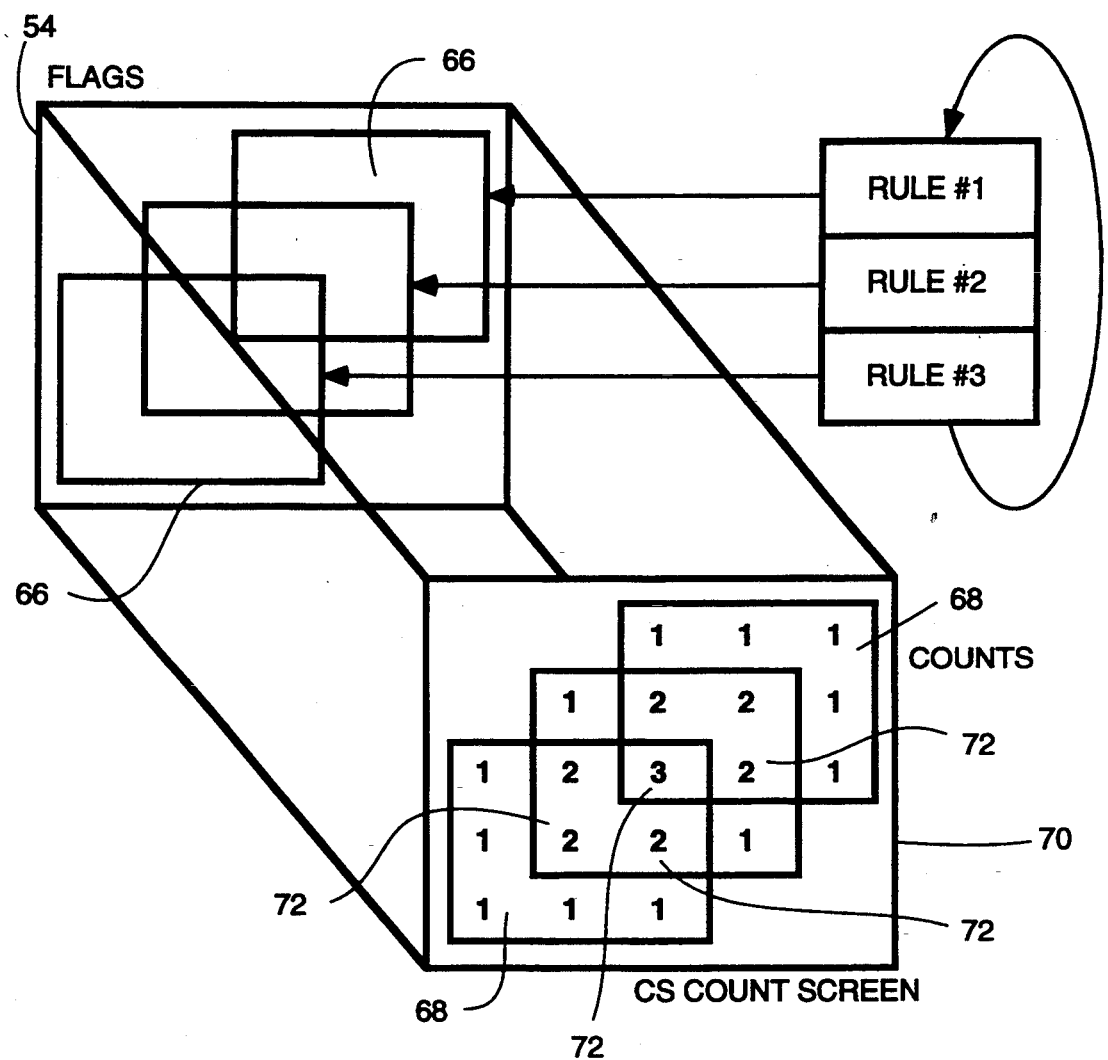
FIG. 5 illustrates the correspondence between the rules, the flag screen and the count screen of the preferred embodiment of the invention.

In order to facilitate overlapping areas of sensitivity 72, the flagging routine is implemented with yet another virtual-type screen stored in memory. Referring to FIG. 5, a count screen 70, having a one-to-one correspondence with the flag screen 54, and thus the virtual screen 52, is included in the computer interface 18. The count screen 70 is employed to account for overlapping areas of sensitivity 72 and includes flags 68 of its own, as described below.

Figure 6:
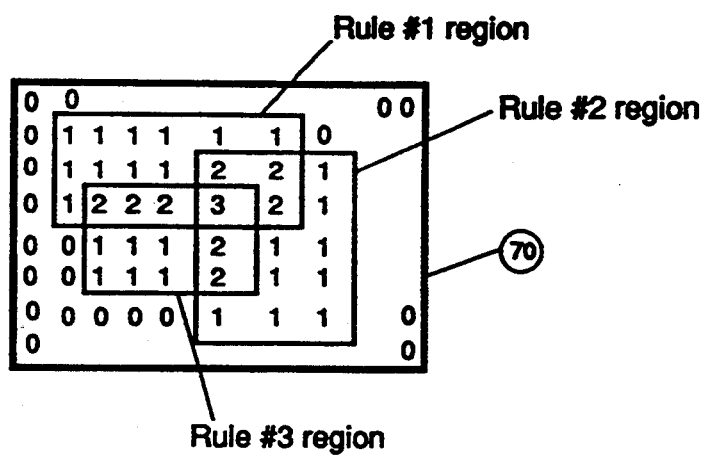
FIG. 6 illustrates a mechanism for accounting for the overlapping areas of sensitivity shown in FIG. 5.

According to the flagging routine, as incoming data 60 is stored in the virtual screen 52, flags 62 associated with those locations are set in the flag screen 54. By defining each count screen flag 68 as an integer, the flags 62 of the flag screen 54 can also be set to integer values to indicate the number of dependent rules, as shown in FIG. 5. The flags 62 on the flag screen 54 are thus set to values from corresponding flags 68 appearing on the count screen 70. On reset of the computer interface 18, these count screen flags 68 are also cleared to all zero values (FIG. 6). For overlapping areas of sensitivity 72, therefore, the integer value of each count screen flag 68 reflects the number of rules associated with that specific area of sensitivity 66 affected by the incoming sequence of characters.

The flagging routine thus cooperates with the loop routine to check only those rules whose associated areas of sensitivity 66 were touched by the incoming data 60. Unless the flags 62 appearing on the flag screen 54 for a specific rule 64 are greater than zero, that rule 64 need not be implemented. Conversely, a specific rule 64 is determined to be implemented by detecting a non-zero value in its area of sensitivity 66 appearing on the flag screen 54. After implementation of each of these rules 64, the flags 62 appearing in that rule's area of sensitivity 66 are decremented by one. The loop routine thus proceeds implementing rules until all of the flags 62 on the flag screen 54 are returned to their zero values.

The flagging routine thus reduces the number of rules 64 performed per cycle of the loop routine to those rules 64 associated with regions of the virtual screen 52 that have changed in response to incoming data 60. The flagging routine increases the speed and efficiency of the computer interface 18 by reducing the mean time between rule implementation. Without such speed and efficiency, the computer interface 18 may otherwise be too slow to perform, or even allow for, certain programs executing on the first computer 14 (FIG. 1).

Figure 7:
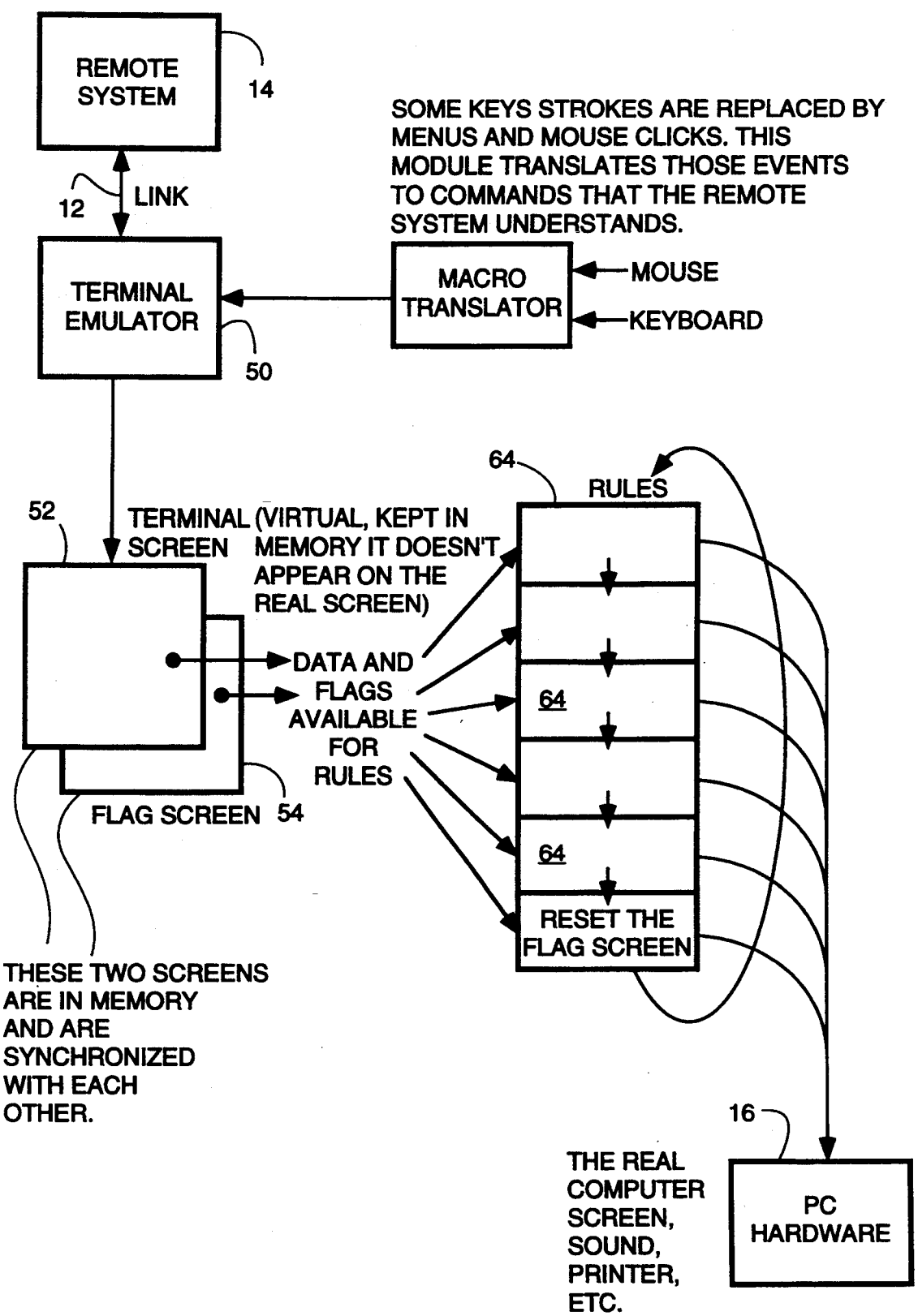
FIG. 7 graphically illustrates the flow of data in the preferred computer interface of the invention and the loop routine for scanning the rules.

According to one preferred embodiment of the invention shown in FIG. 7, the loop routine executes in a cyclical fashion generally returning to Rule No. 1 upon completion of each cycle of the loop. In another preferred embodiment, the looping routine can provide for branching or jumping to critical rules. However, even in this alternate embodiment, all rules 64 identified by the flagging routine are performed before completing the loop. Thus, when programming rules 64 for use with the computer interface 18 it may be advantageous to place any important or system critical rules toward the beginning of the predetermined set of rules. A reset feature is also provided in an alternate embodiment where, upon reset, each and every rule is performed and the entire display screen is re-painted. A copy of a preferred program for use in the computer interface 18, including the loop routine and flagging routine, is provided in the appendix.

The computer interface 18 thus provides a fast and efficient system for communication between one computer environment, such as a mainframe computer, and another computer environment, such as a programmable computer, which are otherwise incompatible. In such a system, specific rules are developed for logical translation of information received from the first computer environment to a format compatible with the second computer environment. The rules themselves are developed by the programmer or operator, but execute through a loop routine included in the computer interface 18. A flagging routine is also provided to increase the efficiency of the computer interface 18 by performing only those rules affected by recent data transferred from the first computer environment.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

```
(c) 1992 Polaris Systems Corporation, All Rights Reserved
//*****************************************************************
//*                                                               *
//*                         MAIN.HPP                              *
//*                                                               *
//*              function main and interrupts                     *
//*                                                               *
//*****************************************************************
#ifndef    _MAIN_HPP //                                            *
#define    _MAIN_HPP //                                            *
//*****************************************************************
```

```cpp
#include   <dos.h>

//************************************************************* define    _ACCESS_PRJ

//*************************************************************
#ifdef     _MAIN_CPP //           global variables              *
//************************************************************* extern unsigned     _stklen = 37000U;

else

//*************************************************************
#endif     //              end of file                          *
#endif     //                                                   *
//*************************************************************

//*************************************************************
//*                                                            *
//*                      MAIN.CPP                              *
//*                                                            *
//*                   initial setups                           *
//*                                                            *
//*************************************************************
#define    _MAIN_CPP //                                         *
//************************************************************* include   "..\libs\ints.hpp"

include   "startend.hpp"
#include   "cofuncs.hpp"
#include   "gscreen.hpp"
#include "book.hpp"
#include   "main.hpp"

//************************************************************* void
     main( int argc, char* argv[] )
     {
     Ints.nrules        = 10;
     Ints.scr_commands = Term_hp2394a;
     Ints.async_indicator( point( 8, 8 ));
     Ints.async_start();
     Ints.timer_en();
//   Ints.scr_direct = YES;
     if( start( argc, argv ))
          {
//        Ints.scr_direct = NO;
//        booking();
          Ints.loop();
          }
//   Ints.scr_direct = NO;
```

```
        end();
        Ints.timer_dis();
        Ints.async_stop();
        }

//****************************************************************
//*              program setup parameters                        *
//**************************************************************** include       "..\libs\graphics.hpp"

uint icons::flags[] =        // icons to be loaded:
        {                       //
          15,                   // icon #1
          2,                    // icon #2
          3,                    // icon #3
          4,                    // icon #4
          5,                    // icon #5
          8,                    // icon #6
          10,                   // icon #7
          11,                   // icon #8
          12,                   // icon #9
          13,                   // icon #10
          16,                   // icon #11
          21,                   // icon #12
          22,                   // icon #13
          21,                   // icon #14
          39,                   // icon #15
          24,                   // icon #16
          18,                   // icon #17
          45,                   // icon #18
          50,                   // icon #19
          49,                   // icon #20
          0                     // end of list
        };                      //
                                //
char*                           //
                                //
        icons::words[] =        // rule-table for icons:
        {                       //
        "\x01"    "default",    // for icon #1
        "\x02"    "cancel",     // for icon #2
        "\x03"    "done",       // for icon #3
        "\x04"    "exit",       // for icon #4
        "\x05"    "add",        // for icon #5
        "\x06"    "find",       // for icon #6
        "\x06"    "look",       // for icon #6
        "\x06"    "search",     // for icon #6
        "\x07"    "edit",       // for icon #7
        "\x08"    "yes",        // for icon #8
        "\x09"    "next",       // for icon #9
        "\x0a"    "back",       // for icon #10
        "\x0b"    "report",     // for icon #11
        "\x0b"    "note",       // for icon #11
        "\x0c"    "book",       // for icon #12
```

```
    "\x0d"      "\xff",       // for icon #13
    "\x0e"      "print",      // for icon #14
    "\x0f"      "quit",       // for icon #15
    "\x10"      "no",         // for icon #16
    "\x11"      "$",          // for icon #17
    "\x12"      "calc",       // for icon #18
    "\x13"      "air",        // for icon #19
    "\x14"      "client",     // for icon #20
    NULL                      // end of list
    };                        //
```

```
//----------------------------------------------------------- undef      defcolor(n,c,m)
define     defcolor(n,c,m)      (c) + ((m) << 4 ), byte graphics::tints[] =
    {
    #include  "..\libs\colors.def"
    0xff
    };
```

```
//*************************************************************
//*                        end of file                        *
//*************************************************************

//*************************************************************
//*                                                           *
//*                        INTS.HPP                           *
//*                                                           *
//*              interrupt routines support                   *
//*                                                           *
//*************************************************************
#ifndef    _INTS_HPP //                                       *
#define    _INTS_HPP //                                       *
//************************************************************* include   "..\libs\graphics.hpp"

//*************************************************************
typedef    void interrupt ( *ifuncp )(...);
typedef    void interrupt ifunc;

//************************************************************* ifunc      getter(...);
ifunc      putter(...);

//************************************************************* typedef struct
```

```
{
char*           seq;
void            (* func)( char* Text );
} sinst;
```

//-----------------------------------------------------------------

```
class ints
    {
    private:
        byte        async_card;         // requested COM port #
        byte        async_data;         // # of data bits
        byte        async_term;         // # of stop bits
        byte        async_parity;       // selected parity
        byte        async_baud;         // selected baud rate
        ifuncp      async_vect;         // old async interrupt vector
        ifuncp      timer_vect;         // old timer interrupt vector
        uint        async_base;         // adress of async I/O ports
        byte        async_index;        // COM port#
        byte        async_irqs[ 2 ];    // IRQs associated with COM ports
        uint        async_ports[ 2 ];   // I/O base adresses for COM ports
        char        async_queue[ 3000 ];    // wait queue
        char*           async_head;     // queue writing position
        char*           async_tail;     // queue reading position
        char*           async_top;      // beginning of queue
        char*           async_end;      // end of queue
        char        async_line[ 514 ];  // serial analysis buffer
        char*           async_lptr;     // current pos. in buffer
        char*           async_lend;     // end of buffer
        point       async_orygin;       // indicator's orygin void        async_en        ( void );
        void        async_dis       ( void );
        void        async_dtr0      ( void );
        void        async_rts0      ( void );
        void        async_dtr1      ( void );
        void        async_rts1      ( void );
        bin         async_init      ( void );
        void        async_clear     ( void );
        bin         async_check     ( void );
        void        async_indicate( void );
        bin         queue_put       ( char Chr );
        char        queue_get       ( void );
        bin         queue_check     ( void );
        void        line_put        ( char Chr );
        void        UART_en ( byte No );
        void        UART_dis( byte No );
        void        ints_en ( void );
        void        ints_dis( void );
        void        vector( byte No, ifuncp New, ifuncp &Old );
        char        parity( char Chr );
```

```cpp
    public:

enum { com1, com2, com3, com4, com5, com6, com7, com8 };
        enum { b110  = 0x00, b150  = 0x20, b300  = 0x40, b600  = 0x60,
               b1200 = 0x80, b2400 = 0xa0, b4800 = 0xc0, b9600 = 0xe0 };
        enum { none   = 0x00, even   = 0x18, odd  = 0x08 };
        enum { dseven = 0x02, deight = 0x03 };
        enum { sone   = 0x00, stwo   = 0x04 };
        char    screen[ 2500 ];      // virtual screen
        char    attrib[ 2500 ];      // virtual screen attributes
        byte    counts[ 2500 ];      // the count screen
        byte    flags [ 2500 ];      // the flag  screen
        uint    nrules;              // number of rules
        bin     done;                // end of program?
        uint    scr_pos;             // current screen position
        byte    scr_attrib;          // current screen attribute
        bin     scr_reverse;         // reverse video
        bin     scr_transp;          // invisible text?
        bin     scr_direct;          // echo chars to phisical screen?
        sinst*  scr_commands;        // escape sequenses
        bin     async_flag;          // indicates any char received
        bin     async_tout;          // time-out indicator ints( void );
                ~ints( void );
        void    timer_en    ( void );
        void    timer_dis   ( void );
        void    async_start( void );
        void    async_stop ( void );
        char    async_get   ( void );
        void    async_put   ( char Chr );
        void    async_send ( char* Text );
        bin     async_online( void );
        char*   async_accept( void );
        void    async_indicator( point& Orygin = point(-1,-1)); //off by no args
        void    line_clr ( void );
        void    scr_process( void );
        bin     scr_inline ( byte Line, char* Text );
        char*   scr_extract( byte Line );
        void    loop( void );

friend ifunc    getter( ... );
        friend ifunc    timer ( ... );
        friend void     setter( void );
};

//*************************************************************
#ifdef    _INTS_CPP //   global variables                      *
//************************************************************* ints            Ints;
```

```
else extern ints            Ints;
extern sinst           Term_hp2394a[];
extern sinst           Term_vt100   [];
extern sinst           Term_vt52    [];
extern sinst           Term_tty     [];

//****************************************************************
#endif    //                                                     *
#endif    //           end of file                               *
//****************************************************************

//****************************************************************
//*                                                               *
//*                     INTS.CPP                                  *
//*                                                               *
//*              interrupt routines support                       *
//*                                                               *
//****************************************************************
#define    _INTS_CPP //                                           *
//**************************************************************** include   <string.h>
include   <stdlib.h>
#include   <stdio.h>
#include   <ctype.h>
#include   <bios.h>
include   <dos.h> include   "..\libs\terminal.hpp"
include   "..\libs\ints.hpp"

//**************************************************************** define    MASK_PORT        0x21
define    EOI_PORT                  0x20
define    EOI_CMD                   0x20 define    ENABLE_RCV_INT   0x01
define    OUT2                      0x08
#define    RCV_DATA                  0x00
#define    XMT_DATA                  0x00
#define    INT_ENABLE                0x01
#define    MODEM_CTRL                0x04
define    LINE_STATUS               0x05 define    XMT_RDY                   0x20
define    XMT_DTR                   0x01
#define    XMT_RTS          0x02
define    RCV_ERRS                  0x1e define    BIOS_DATA        0x40     // segment for bios data
define    INT_TABLE        0x08     // start of interrupt handler
vectors //----------- async line masks --------------------
```

```
#define    ASYNC_TIMEOUT        0x8000
#define    ASYNC_XMIT_HOLD      0x4000
#define    ASYNC_XMIT_SHIFT     0x2000
#define    ASYNC_DATA_READY     0x0100
#define    ASYNC_RING_IND       0x0040
define    ASYNC_SD_CLEAR       0x0010 define    LINE_OFFSET          11 void       scr_cursor_on ( void );
void       scr_cursor_off( void );

static char    scr_cursor_char = ' ';
static uint    count = 5000;

//***************************************************************** ifunc getter(...)
    {
    byte stat, chr;

stat = inportb( Ints.async_base + LINE_STATUS ) & RCV_ERRS;
    chr  = inportb( Ints.async_base + RCV_DATA );
    if( !stat )
        {
        Ints.queue_put( chr );
        if( chr == '\x0d' )
            count = 5000;
        }
    Ints.async_clear();
    }

//***************************************************************** ifunc putter(...)
    {
    if( !count-- )
        {
        Ints.async_send( "M\x0d" );
        count = 5000;
        Ints.async_tout = YES;
        }
    }

//***************************************************************** void setter( void )
    {
    // setup the count screen
    }
```

```
//************************************************************* void
    ints::timer_en( void )
    {
    vector( 0x0014 + INT_TABLE, putter, timer_vect );
    }

//----------------------------------------------------------- void
    ints::timer_dis( void )
    {
    vector( 0x0014 + INT_TABLE, timer_vect, ifuncp( NULL ));
    }

//************************************************************* void
    ints::async_en( void )
    {
    uint int_no, stat;

int_no = async_irqs[ async_index ];
    vector( int_no + INT_TABLE, getter, async_vect );
    UART_en( int_no );
    outportb( async_base + INT_ENABLE, ENABLE_RCV_INT );
    stat = inportb( async_base + MODEM_CTRL ) | OUT2;
    outportb( async_base + MODEM_CTRL, stat );
    }

//-----------------------------------------------------------
void
    ints::async_dis( void )
    {
    uint     int_no, stat;

int_no = async_irqs[ async_index ];
    UART_dis( int_no );
    stat = inportb( async_base + MODEM_CTRL ) & ( ~OUT2 );
    outportb( async_base + MODEM_CTRL, stat );
    outportb( async_base + INT_ENABLE, 0 );
    UART_dis( int_no );
    vector( int_no + INT_TABLE, async_vect, ifuncp( NULL ));
    }

//----------------------------------------------------------- void
```

```c
ints::async_dtr0( void )
{
uint      stat;

stat = inportb( async_base + MODEM_CTRL ) & ~XMT_DTR;
outportb( async_base + MODEM_CTRL, stat );
}
```

//----------------------------------------------------------------

```c
void ints::async_rts0( void )
    {
uint      stat;

stat = inportb( async_base + MODEM_CTRL ) & ~XMT_RTS;
outportb( async_base + MODEM_CTRL, stat );
}
```

//----------------------------------------------------------------

```c
void ints::async_dtr1( void )
    {
uint      stat;

stat = inportb( async_base + MODEM_CTRL ) | XMT_DTR;
outportb( async_base + MODEM_CTRL, stat );
}
```

//----------------------------------------------------------------

```c
void ints::async_rts1( void )
    {
uint      stat;

stat = inportb( async_base + MODEM_CTRL ) | XMT_RTS;
outportb( async_base + MODEM_CTRL, stat );
}
```

//----------------------------------------------------------------

```c
char ints::async_get( void )
    {
char ret;

ints_dis();
ret = queue_get();
ints_en();
return ret;
```

```
        }
//----------------------------------------------------------------
bin ints::async_init( void )
    {
    async_index = 0xff;
    async_base = peek( BIOS_DATA, async_card * 2 );
    for( int i = 0; i < 2; i++ )
        {
        if( async_base == async_ports[ i ] )
            {
            async_index = i;
            break;
            }
        }
    return( async_index == 0xff ? NO : YES );
    }

//----------------------------------------------------------------
bin ints::async_check( void )
    {
    bin  ret;

ints_dis();
    ret = queue_check();
    ints_en();
    return ret;
    }

//----------------------------------------------------------------
void ints::async_clear( void )
    {
    ints_dis();
    outportb( EOI_PORT, EOI_CMD );
    }

//----------------------------------------------------------------
bin ints::queue_put( char Chr )
    {
    register char* ptr;

line_put( Chr );
    async_flag = YES;
    ptr = async_tail;
    *ptr = Chr;
```

```
    ptr++;
    if( ptr == async_end )
        ptr = async_top;
    if( ptr != async_head )
        {
        async_tail = ptr;
        return YES;
        }
    else
        return NO;
    }
//----------------------------------------------------------
``` char

```
    ints::queue_get( void )
    {
    char                chr;
    register char* ptr;

ptr = async_head;
    if( ptr != async_tail )
        {
        chr = *ptr;
        ptr++;
        if( ptr == async_end )
            ptr = async_top;
        async_head = ptr;
        async_indicate();
        return chr;
        }
    else
        return 0xff;
    }
//----------------------------------------------------------
``` bin

```
    ints::queue_check( void )
    {
    return( async_tail == async_head ? NO : YES );
    }
//----------------------------------------------------------
``` void

```
    ints::line_put( char Chr )
    {
    register char* ptr = async_lptr++;

*ptr++ = Chr;
    *ptr   = '\x00';
    ptr   += 255;
    *ptr++ = Chr;
```

```c
    *ptr   = '\x00';
    if( async_lptr == async_lend )
        async_lptr = async_line;
    }
```

//------------------------------------------------------------

```c
void ints::line_clr( void )
    {
    async_lptr                 = async_line;
    async_lend                 = async_line + 255;
    memset( async_line, 0, 512 );
    }
```

//------------------------------------------------------------

```c
void ints::UART_en( byte Int_no )
    {
    uint stat;

stat = inportb( MASK_PORT );
    stat &= ~( 1 << Int_no );
    outportb( MASK_PORT, stat );
    }
```

//------------------------------------------------------------

```c
void ints::UART_dis( byte Int_no )
    {
    uint stat;

stat = inportb( MASK_PORT );
    stat |= ( 1 << Int_no );
    outportb( MASK_PORT, stat );
    }
```

//------------------------------------------------------------

```c
void ints::ints_dis( void )
    {
    asm  cli
    }
```

//------------------------------------------------------------

```c
void ints::ints_en( void )
    {
```

```
        asm    sti
        }
//-------------------------------------------------------------
void
    ints::async_indicate( void )
        {
        static byte    n;

if( !!async_orygin )
            {
            n &= 0x0f;
            setfillstyle( SOLID_FILL, n++ );
            bar( async_orygin.x, async_orygin.y, async_orygin.x + 3, async_orygin.y + 3 );
            }
        }

//-------------------------------------------------------------
void
    ints::vector( byte No, ifuncp New, ifuncp &Old )
        {
        if( New )
            {
            if( &Old )
                    Old = getvect( No );
            setvect( No, New );
            }
        }
//-------------------------------------------------------------
char
    ints::parity( char Chr )
        {
        if( async_parity == none )
            return Chr;

char chr = Chr, i = 7, t = async_parity / 0x18;

while( i-- )
            {
            if( Chr & 0x01 )
                    t++;
            Chr >>= 0x01;
            }
        if( t & 0x01 )
            chr |= 0x80;
        return chr;
        }

//-------------------------------------------------------------
```

```c
ints::ints( void )
{
FILE*     in = fopen( "COMPORT.CNF", "rt" );
char line[ 81 ];
char*     cptr = line + LINE_OFFSET;

async_flag = NO;
async_card = com1;
async_baud = b2400;
async_data = deight;
async_term = sone;
async_parity = none;
for(;in;)
    {
    if( !fgets( line, 81, in ))
        {
        fclose( in );
        break;
        }
    if( !strncmp( line, "data bits:", 10 ))
        {
        switch( *cptr )
            {
            case '7':
                async_data = dseven;
                break;
            default:
                async_data = deight;
                break;
            }
        }
    else
    if( !strncmp( line, "stop bits:", 10 ))
        {
        switch( *cptr )
            {
            case '2':
                async_term = stwo;
                break;
            default:
                async_term = sone;
                break;
            }
        }
    else
    if( !strncmp( line, "com port :", 10 ))
        {
        switch( *cptr )
            {
            case '2':
                async_card = com2;
                break;
            default:
                async_card = com1;
                break;
            }
        }
```

```
                }
        else
        if( !strncmp( line, "parity    :", 10 ))
            {
            switch( *cptr )
                {
                case 'e':
                    async_parity = even;
                    break;
                case 'o':
                    async_parity = odd;
                    break;
                default:
                    async_parity = none;
                    break;
                }
            }
        else
        if( !strncmp( line, "baud rate:", 10 ))
            {
            switch( *cptr )
                {
                case '1':
                    async_baud = b1200;
                    break;
                case '9':
                    async_baud = b9600;
                    break;
                default:
                    async_baud = b2400;
                    break;
                }
            }
        }
    async_ports[ 0 ]    = 0x03f8;
    async_ports[ 1 ]    = 0x02f8;
    async_irqs [ 0 ]    = 0x04;
    async_irqs [ 1 ]    = 0x03;
    async_head          = async_queue;
    async_tail          = async_queue;
    async_end           = async_queue + 2023;
    async_top           = async_queue;
    async_lptr          = async_line;
    async_lend          = async_line + 255;
    async_line[   0 ] = '\x00';
    async_line[ 256 ] = '\x00';
async_tout          = NO;
    if( !Ints.async_init())
        {
        printf( " Unrecognizable RS232 async port address detected." );
        exit( 10 );
        }
    bioscom( 0, async_baud | async_parity | async_data | async_term, async_index );
    memset( screen, 0x20, 2000 );
    memset( attrib, 0x00, 2000 );
```

```
    scr_pos     = 0;
    scr_attrib  = YELLOW;
    scr_reverse = NO;
    scr_transp  = NO;
    scr_direct  = NO;
    memset( counts, 0, 2000 );
    memset( flags,  0, 2000 );
    setter();
    done = NO;
    }
```

//------------------------------------------------------------

```
    ints::~ints( void )
    {
    }
```

//------------------------------------------------------------

```
void ints::async_start( void )
    {
    async_dis();
    async_clear();
    getter();
    async_en();
 async_dtr0();
 async_rts0();
 async_dtr1();
 async_rts1();
    }
```

//------------------------------------------------------------

```
void ints::async_stop( void )
    {
    async_dis();
    }
```

//------------------------------------------------------------

```
void ints::async_put( char Chr )
    {
 for( long j = 500001; j; j-- )
    {
        if( inportb( async_base + LINE_STATUS ) & XMT_RDY )
        {
            outportb( async_base + XMT_DATA, parity( Chr ));
        break;
        }
```

```
//----------------------------------------------------------------
void
    ints::async_send( char* Text )
    {
    char*    term = (char *) memchr( Ints.screen + 1680, ':',
240 );
    char*    ptr = Text;

if( term )
        *term = ' ';
    while( *ptr )
        async_put( *ptr++ );
    }

//----------------------------------------------------------------
char*
    ints::async_accept( void )
    {
    do
        {
        async_flag = NO;
        delay( 300 );
        scr_process();
        }
    while( async_flag );
    return async_lptr;
    }

//----------------------------------------------------------------
bin
    ints::async_online( void )
    {
    return( bioscom( 3, '\x00', async_index ) & 0x0080 ? YES :
NO );
    }

//----------------------------------------------------------------
void
    ints::async_indicator( point& Orygin )
    {
    async_orygin = Orygin;
    }

//----------------------------------------------------------------
```

```
void
    ints::scr_process( void )
    {
    while( async_check())
        {
        static sinst*   seq_ptr = scr_commands;
        static char     line[ 32 ];    // esc sequence
        static char     text[ 32 ];    // exp string
        static char     str [ 32 ];    // real string
        static int      pos  = 0;
        static int      pstr = 0;
        char            c = async_get();

if( isdigit( c ))
            {
            if( pos )
                {
                if( line[ pos - 1 ] != 'N' )
                    {
                    text[ pos   ] = '0';
                    line[ pos++ ] = 'N';
                    text[ pos   ] = c;
                    line[ pos++ ] = 'N';
                    }
                else
                if( pos > 1 && text[ pos - 2 ] == '0' )
                    {
                    pos--;
                    pos--;
                    text[ pos ] = text[ pos + 1 ];
                    pos++;
                    text[ pos ] = c;
                    pos++;
                    }
                else
                    {
                    text[ pos ] =  c;
                    line[ pos ] = 'N';
                    pos++;
                    }
                }
            else
                {
                text[ pos   ] = '0';
                line[ pos++ ] = 'N';
                text[ pos   ] =  c;
                line[ pos++ ] = 'N';
                }
            }
        else
            {
            text[ pos ] = c;
            line[ pos ] = c;
            pos++;
            }
```

```
            str [ pstr ] = c;
            pstr++;
            str [ pstr ] = '\0';
            text[ pos  ] = '\0';
            line[ pos  ] = '\0';
            while( seq_ptr -> seq )
            {
                int  result = strncmp( line, seq_ptr -> seq, pos );

if( !result )
                {
                    if( seq_ptr -> seq[ pos ] == '\0' )
                    {
                        (*seq_ptr -> func)( text );
                        pos  = 0;
                        pstr = 0;
                        seq_ptr = scr_commands;
                    }
                    return;
                }
                else
                if( result < 0 )
                    seq_ptr++;
                else
                    break;
            }
        if( 1 )
        {
            scr_cursor_off();
            if( scr_direct )
            {
                uint x = scr_pos % 80, y = scr_pos / 80, len = strlen( line );
                byte fore = scr_attrib & 0x0f, back = scr_attrib / 0x10;

x *= 8, y *= ( getmaxcolor() == 1 ? 12 : 16 );

y += 4;

setfillstyle( SOLID_FILL, scr_reverse ? fore : back );
                bar( x, y - 4, x + 8 * len, y + 11 );
                moveto( x, y );
                setcolor( scr_reverse ? back : fore );
                outtext( str );
            } char*     pnr = str;

while( *pnr )
            {
                attrib[ scr_pos ] = scr_attrib;
                screen[ scr_pos ] = *pnr++;
                flags [ scr_pos ] = counts[ scr_pos ];
```

```
                    scr_pos++;
                    scr_pos %= 2000;
                    }
                scr_cursor_on();
                }
            pos  = 0;
            pstr = 0;
            seq_ptr = scr_commands;
            }
        }
//------------------------------------------------------------
bin ints::scr_inline( byte Line, char* Text )
    {
    static char    line[ 81 ];

strncpy( line, screen + Line * 80 - 80, 81 );
    line[ 80 ] = '\0';
    if( strstr( line, Text ))
        return YES;
    else
        return NO;
    }

//------------------------------------------------------------
char* ints::scr_extract( byte Line )

{
    static char    line[ 81 ];

strncpy( line, screen + Line * 80 - 80, 81 );
    line[ 80 ] = '\0';
    return line;
    }

//------------------------------------------------------------
void ints::loop( void )
    {
    int  index = 0;

for(;;)
        {
        if( Rules[ index ] -> affected())
            {
            Rules[ index ] -> execute();
            Rules[ index ] -> cleanup();
            }
        if( done )
```

```
            break;
        index++;
        index %= nrules;
        }
    }

//*************************************************************** void scr_set_xy1    ( char* Text );
    void scr_set_xy2    ( char* Text );
    void scr_set_yx1    ( char* Text );
    void scr_set_yx2    ( char* Text );
    void scr_set_yx3    ( char* Text );
    void scr_set_high   ( char* Text );
    void scr_set_norm   ( char* Text );
    void scr_set_dark   ( char* Text );
    void scr_set_attr1  ( char* Text );
    void scr_set_0attr  ( char* Text );
    void scr_set_1attr  ( char* Text );
    void scr_set_2attr  ( char* Text );
    void scr_set_3attr  ( char* Text );
    void scr_set_rvrs   ( char* Text );
    void scr_set_on     ( char* Text );
    void scr_set_off    ( char* Text );
    void scr_clr_eol    ( char* Text );
    void scr_clr_eol1   ( char* Text );
    void scr_clr_eos    ( char* Text );
    void scr_clr_all    ( char* Text );
    void scr_put_tab    ( char* Text );
    void scr_put_bs     ( char* Text );
    void scr_put_cr     ( char* Text );
    void scr_put_up     ( char* Text );
    void scr_put_down   ( char* Text );
    void scr_put_left   ( char* Text );
    void scr_put_right  ( char* Text );
    void scr_put_1up    ( char* Text );
    void scr_put_1down  ( char* Text );
    void scr_put_1left  ( char* Text );
    void scr_put_1right ( char* Text );
    void scr_put_up1    ( char* Text );
    void scr_put_up2    ( char* Text );
    void scr_put_down1  ( char* Text );
    void scr_put_home   ( char* Text );
    void scr_put_null   ( char* Text );
    void scr_put_crlf   ( char* Text );

//----------------------------------------------------------------- sinst

Term_hp2394a[] =
    {
        { "\x1b""[NNm",             scr_set_attr1 },
        { "\x1b""[NNA",             scr_put_up2   },
        { "\x1b""[NN;NNf",      scr_set_yx2      },
        { "\x1b""[NN;NN;NNm",   scr_set_attr1 },
```

```
        {   "\x1b""[K",                       scr_put_home   },
        {   "\x1b""[J",                       scr_clr_eos    },
        {   "\x1b""K",                        scr_clr_eol    },
        {   "\x1b""J",                        scr_clr_eos    },
        {   "\x1b""A",                        scr_put_up1    },
        {   "\x1b""3",                        scr_put_null   },
        {   "\x1b""1",                        scr_put_null   },
        {   "\x1b""*s^",                      scr_put_null   },
        {   "\x1b""&jB",                      scr_set_on     },
        {   "\x1b""&jA",                      scr_put_null   },
        {   "\x1b""&fNNaNNkNNdNNL",    scr_set_off    },
        {   "\x1b""&dsD",                     scr_set_dark   },
        {   "\x1b""&dN",                      scr_set_high   },
        {   "\x1b""&dF",                      scr_set_rvrs   },
        {   "\x1b""&dD",                      scr_set_high   },
        {   "\x1b""&dA",                      scr_put_null   },
        {   "\x1b""&d@",                      scr_set_norm   },
        {   "\x1b""&aNNrNNC",                 scr_set_yx1    },
        {   "\x1b""&aNNcNNR",                 scr_set_xy1    },
        {   "\x11",                           scr_put_null   },
        {   "\x0d",                           scr_put_cr     },
        {   "\x0a",                           scr_put_down1  },
        {   "\x9",                            scr_put_tab
    },
        {   NULL,                             NULL
    }
};

//------------------------------------------------------------ void
    scr_cursor_on( void )
    {
    uint x = ( Ints.scr_pos % 80 ) * 8;
    uint y = ( Ints.scr_pos / 80 ) * ( getmaxcolor() == 1 ? 12 : 16 );

if( Ints.scr_direct )
            {
            scr_cursor_char = Ints.screen[ Ints.scr_pos ];
            setfillstyle( SOLID_FILL, BLACK );
            bar( x, y, x + 7, y + 15 );
            setfillstyle( SOLID_FILL, LIGHTCYAN );
            bar( x, y + 3, x + 7, y + 12 );
            moveto( x, y + 4 );
            }
    }

//------------------------------------------------------------ void
    scr_cursor_off( void )
    {
    uint x = ( Ints.scr_pos % 80 ) * 8;
    uint y = ( Ints.scr_pos / 80 ) * ( getmaxcolor() == 1 ? 12
```

```
: 16 );

if( Ints.scr_direct )
        {
        char chr[ 2 ] = " ";

setfillstyle( SOLID_FILL, BLACK );
        bar( x, y, x + 7, y + 15 );
        moveto( x, y + 4 );
        *chr = scr_cursor_char;
        outtext( chr );
        }
    }

//------------------------------------------------------------ void
    scr_set_xy1( char* Text )
    {
    uint x = ( Text[ 3 ] - '0' ) * 10 + Text[ 4 ] - '0' + 1;
    uint y = ( Text[ 6 ] - '0' ) * 10 + Text[ 7 ] - '0' + 1;

scr_cursor_off();
    Ints.scr_pos = x + y * 80 - 81;
    scr_cursor_on();
    }

//------------------------------------------------------------ void
    scr_set_xy2( char* Text )
    {
    uint x = ( Text[ 2 ] - '0' ) * 10 + Text[ 3 ] - '0';
    uint y = ( Text[ 5 ] - '0' ) * 10 + Text[ 6 ] - '0';

scr_cursor_off();
    Ints.scr_pos = x + y * 80 - 81;
    scr_cursor_on();
    }

//------------------------------------------------------------ void
    scr_set_yx1( char* Text )
    {
    uint y = ( Text[ 3 ] - '0' ) * 10 + Text[ 4 ] - '0' + 1;
    uint x = ( Text[ 6 ] - '0' ) * 10 + Text[ 7 ] - '0' + 1;

scr_cursor_off();
    Ints.scr_pos = x + y * 80 - 81;
    scr_cursor_on();
    }

//------------------------------------------------------------
```

```c
void
    scr_set_high( char* )
    {
    Ints.scr_attrib &= 0x0f;
    Ints.scr_attrib |= WHITE;
    }

//------------------------------------------------- void
    scr_set_norm( char* )
    {
    Ints.scr_reverse = NO;
    Ints.scr_attrib  = YELLOW;
    }

//------------------------------------------------- void
    scr_set_dark( char* )
    {
    Ints.scr_attrib &= 0x0f;
    }

//------------------------------------------------- void
    scr_set_attr1( char* Text )
    {
    byte c = Text[ 2 ];

if( c == '0' )
        scr_set_norm( Text );
    else
    if( c == '8' )
        scr_set_dark( Text );
    }

//------------------------------------------------- void
    scr_set_rvrs( char* )
    {
    Ints.scr_reverse = YES;
    }

//------------------------------------------------- void
    scr_set_on( char* )
    {
```

```
        Ints.scr_transp = NO;
        }

//---------------------------------------------------------------- void scr_set_off( char* )
    {
    Ints.scr_transp = YES;
    }

//---------------------------------------------------------------- void scr_clr_eol( char* )
    {
    scr_cursor_off();
    memset( Ints.screen + Ints.scr_pos, ' ', 80 - Ints.scr_pos
% 80 );
    if( Ints.scr_direct )
        {
        uint x = Ints.scr_pos % 80, y = Ints.scr_pos / 80;

x *= 8, y *= ( getmaxcolor() == 1 ? 12 : 16 );
        setfillstyle( SOLID_FILL, Graph.tint( SCR_BGND ));
        bar( x, y, getmaxx(), y + 15 );
        }
    scr_cursor_on();
    }

//---------------------------------------------------------------- void scr_clr_eos( char* )
    {
    scr_cursor_off();
    memset( Ints.screen + Ints.scr_pos, ' ', 2000 - Ints.scr_pos
);
    if( Ints.scr_direct )
        {
        uint x = Ints.scr_pos % 80, y = Ints.scr_pos / 80;

x *= 8, y *= ( getmaxcolor() == 1 ? 12 : 16 );
        setfillstyle( SOLID_FILL, Graph.tint( SCR_BGND ));
        bar( x, y, getmaxx(), y + 15 );
        bar( 0, y + 15, getmaxx(), getmaxy());
        }
    scr_cursor_on();
    }

//---------------------------------------------------------------- void
```

```
    scr_put_tab( char* )
    {
    scr_cursor_off();
    Ints.scr_pos &= ~0x0007;
    Ints.scr_pos += 8;
    scr_cursor_on();
    }
```

//----------------------------------------------------------------

```
void scr_put_cr( char* )
    {
    scr_cursor_off();
    Ints.scr_pos -= Ints.scr_pos % 80;
    scr_cursor_on();
    }
```

//----------------------------------------------------------------

```
void scr_put_up1( char* )
    {
    scr_cursor_off();
    if( Ints.scr_pos >= 80 )
        Ints.scr_pos -= 80;
    scr_cursor_on();
    }
```

//----------------------------------------------------------------

```
void scr_put_up2( char* )
    {
    scr_cursor_off();
    if( Ints.scr_pos >= 80 )
        Ints.scr_pos -= 80;
    scr_cursor_on();
    }
```

//----------------------------------------------------------------

```
void scr_put_down1( char* )
    {
    scr_cursor_off();
    Ints.scr_pos += 80;
    if( Ints.scr_pos >= 2000 )
        {
        scr_put_home( NULL );
        scr_clr_eos ( NULL );
        }
```

```c
    scr_cursor_on();
    }

//---------------------------------------------------------------- void scr_put_home( char* )
    {
    scr_cursor_off();
    Ints.scr_pos = 0;
    scr_cursor_on();
    }

//---------------------------------------------------------------- void scr_put_null( char* )
    {
    }

//---------------------------------------------------------------- sinst

Term_vt100[] =
    {
        { "\x1b""[m",              scr_set_0attr    },
        { "\x1b""[l",              scr_put_null     },
        { "\x1b""[h",              scr_put_null     },
        { "\x1b""[NNm",            scr_set_1attr    },
        { "\x1b""[NNl",            scr_put_null     },
        { "\x1b""[NNh",            scr_put_null     },
        { "\x1b""[NNK",            scr_clr_eol1     },
        { "\x1b""[NNJ",            scr_clr_all      },
        { "\x1b""[NND",            scr_put_left     },
        { "\x1b""[NNC",            scr_put_right    },
        { "\x1b""[NNB",            scr_put_down     },
        { "\x1b""[NNA",            scr_put_up       },
        { "\x1b""[NN;NNm",         scr_set_2attr    },
        { "\x1b""[NN;NNf",         scr_set_yx2      },
        { "\x1b""[NN;NNH",         scr_set_yx2      },
        { "\x1b""[NN;NNF",         scr_set_yx2      },
        { "\x1b""[NN;NN;NNm",      scr_set_3attr    },
        { "\x1b""[K",              scr_clr_eol      },
        { "\x1b""[J",              scr_clr_eos      },
        { "\x1b""[H",              scr_put_home     },
        { "\x1b""[F",              scr_put_home     },
        { "\x1b""[D",              scr_put_1left    },
        { "\x1b""[C",              scr_put_1right   },
        { "\x1b""[B",              scr_put_1down    },
        { "\x1b""[A",              scr_put_1up      },
        { "\x1b""[;m",             scr_put_null     },
        { "\x1b""M",               scr_put_1up      },
        { "\x1b""E",               scr_put_crlf     },
```

```
        { "\x1b""D",                       scr_put_1down   },
        { "\x0d",                          scr_put_cr      },
        { "\x0a",                          scr_put_down1   },
        { "\x9",                           scr_put_tab     },
        { "\x8",                           scr_put_bs      },
        { NULL,                            NULL            }
    };
//------------------------------------------------------------
void
    scr_set_yx2( char* Text )
    {
    uint y = ( Text[ 2 ] - '0' ) * 10 + Text[ 3 ] - '0';
    uint x = ( Text[ 5 ] - '0' ) * 10 + Text[ 6 ] - '0';

scr_cursor_off();
    Ints.scr_pos = x + y * 80 - 81;
    scr_cursor_on();
    }

//------------------------------------------------------------
void
    scr_clr_all( char* Text )
    {
    uint d = ( Text[ 2 ] - '0' ) * 10 + Text[ 3 ] - '0';
  scr_cursor_off();
  switch( d )
    {
      case 0:
          scr_clr_eos( NULL );
        break;
      case 1 :
            memset( Ints.screen, ' ', Ints.scr_pos + 1 );
            if( Ints.scr_direct )
                {
                uint x = Ints.scr_pos % 80, y = Ints.scr_pos / 80;

x *= 8, y *= ( getmaxcolor() == 1 ? 12 : 16 );
                setfillstyle( SOLID_FILL, Graph.tint( SCR_BGND ));
                bar( 0, y, x, y + 15 );
                bar( 0, 0, getmaxx(), y );
                }
          break;
        case 2 :
            memset( Ints.screen, ' ', 2000 );
            if( Ints.scr_direct )
                {
                setfillstyle( SOLID_FILL, Graph.tint( SCR_BGND ));
```

```
                bar( 0, 0, getmaxx(), getmaxy());
            }
        break;
        }
    scr_cursor_on();
    }

//-----------------------------------------------------------
void scr_put_left( char* Text )
    {
    uint d = ( Text[ 2 ] - '0' ) * 10 + Text[ 3 ] - '0';

scr_cursor_off();
    if( Ints.scr_pos >= d )
        Ints.scr_pos -= d;
    scr_cursor_on();
    }

//-----------------------------------------------------------
void scr_put_right( char* Text )
    {
    uint d = ( Text[ 2 ] - '0' ) * 10 + Text[ 3 ] - '0';
    scr_cursor_off();
    Ints.scr_pos += d;
    if( Ints.scr_pos >= 2000 )
        {
        scr_put_home( NULL );
        scr_clr_all ( NULL );
        }
    scr_cursor_on();
    }

//-----------------------------------------------------------
void scr_put_up( char* Text )
    {
    uint d = ( Text[ 2 ] - '0' ) * 10 + Text[ 3 ] - '0';

scr_cursor_off();
    if( Ints.scr_pos >= d * 80 )
        Ints.scr_pos -= d * 80;
    scr_cursor_on();
    }

//-----------------------------------------------------------
void
```

```
    scr_put_down( char* Text )
    {
    uint d = ( Text[ 2 ] - '0' ) * 10 + Text[ 3 ] - '0';

scr_cursor_off();
    Ints.scr_pos += d * 80;
    if( Ints.scr_pos >= 2000 )
      {
       scr_put_home( NULL );
       scr_clr_all ( NULL );
      }
    scr_cursor_on();
    }
```

//-------------------------------------------------------------

```
void scr_put_1left( char* )
    {
    scr_cursor_off();
    if( Ints.scr_pos )
         Ints.scr_pos -= 1;
    scr_cursor_on();
    }
```

//-------------------------------------------------------------

```
void scr_put_1right( char* )
    {
    scr_cursor_off();
    Ints.scr_pos += 1;
    if( Ints.scr_pos >= 2000 )
      {
       scr_put_home( NULL );
       scr_clr_all ( NULL );
      }
    scr_cursor_on();
    }
```

//-------------------------------------------------------------

```
void scr_put_1up( char* )
    {
    scr_cursor_off();
    if( Ints.scr_pos >= 80 )
         Ints.scr_pos -= 80;
    scr_cursor_on();
    }
```

//-------------------------------------------------------------

```
void
```

```
    scr_put_1down( char* )
    {
    scr_cursor_off();
    Ints.scr_pos += 80;
if( Ints.scr_pos >= 2000 )
    {
     scr_put_home( NULL );
     scr_clr_all ( NULL );
     }
    scr_cursor_on();
    }

//----------------------------------------------------------- void scr_put_bs( char* )
    {
    scr_cursor_off();
if( Ints.scr_pos )
        Ints.scr_pos -= 1;
    scr_cursor_on();
    }

//----------------------------------------------------------- void scr_put_crlf( char* )
    {
scr_put_cr( NULL );
    scr_put_down1( NULL );
    }

//----------------------------------------------------------- void scr_set_0attr( char* )
    {
Ints.scr_attrib  = YELLOW;
Ints.scr_reverse = NO;
if( Ints.scr_direct )
    setcolor( Ints.scr_attrib );
    }

//----------------------------------------------------------- void scr_set_1attr( char* Text )
    {
    uint d = ( Text[ 2 ] - '0' ) * 10 + Text[ 3 ] - '0';

switch( d )
      {
       case 0:
```

```
            scr_set_0attr( NULL );
            break;
       case 1 :
       case 4 :
       case 5 :
            Ints.scr_attrib &= 0xf0;
          Ints.scr_attrib |= WHITE;
            break;
      case 7 :
                Ints.scr_reverse = YES;
            break;
       case 27:
            Ints.scr_reverse = NO;
            break;
       case 22:
       case 24:
       case 25:
             Ints.scr_attrib &= 0xf0;
          Ints.scr_attrib |= YELLOW;
            break;
       }
    if( Ints.scr_direct )
       setcolor( Ints.scr_attrib );
       }
//----------------------------------------------------------- void scr_set_2attr( char* Text )
      {
    scr_set_1attr( Text );
    Text++; Text++; Text++;
    scr_set_1attr( Text );
       }

//----------------------------------------------------------- void scr_set_3attr( char* Text )
      {
    scr_set_1attr( Text );
    Text++; Text++; Text++;
      scr_set_1attr( Text );
    Text++; Text++; Text++;
    scr_set_1attr( Text );
       }

//----------------------------------------------------------- void scr_clr_eol1( char* Text )
      {
    uint d = ( Text[ 2 ] - '0' ) * 10 + Text[ 3 ] - '0';
```

```
    scr_cursor_off();
  switch( d )
    {
      case 0:
          scr_clr_eol( NULL );
        break;
      case 1 :
              memset( Ints.screen + 80 * ( Ints.scr_pos / 80 ),
' ', 1 + ( Ints.scr_pos % 80 ));
            if( Ints.scr_direct )
                {
                uint x = Ints.scr_pos % 80 + 1, y =
Ints.scr_pos / 80;

x *= 8, y *= ( getmaxcolor() == 1 ? 12 : 16
);
                setfillstyle(   SOLID_FILL,    Graph.tint(
SCR_BGND ));
                bar( 0, y, x, y + 15 );
                }
        break;
      case 2 :
              memset( Ints.screen + 80 * ( Ints.scr_pos / 80 ),
' ', 80 );
          Ints.scr_pos = 80 * ( Ints.scr_pos / 80 );
            if( Ints.scr_direct )
                {
                uint y = Ints.scr_pos / 80;

y *= ( getmaxcolor() == 1 ? 12 : 16 );
                setfillstyle(   SOLID_FILL,    Graph.tint(
SCR_BGND ));
                bar( 0, y, getmaxx(), y + 15 );
          moveto( 0, y + 4 );
                }
        break;
    }
    scr_cursor_on();
  }

//------------------------------------------------------------ sinst

Term_vt52[] =
    {
        { "\x1b""Y",                    scr_set_yx3      },
        { "\x1b""K",                    scr_clr_eol      },
        { "\x1b""J",                    scr_clr_eos      },
        { "\x1b""H",                    scr_put_home     },
        { "\x1b""D",                    scr_put_1left    },
        { "\x1b""C",                    scr_put_1right   },
        { "\x1b""B",                    scr_put_1down    },
        { "\x1b""A",                    scr_put_1up      },
        { "\x0d",                       scr_put_cr       },
        { "\x0a",                       scr_put_down1    },
```

```
            { "\x9",                              scr_put_tab     },
            { "\x8",                              scr_put_bs      },
            { "\x7",                              scr_put_null    },
            { NULL,                               NULL            }
        };

//---------------------------------------------------------------- void scr_set_yx3( char* )
        {
    long    timeout = 100000l;
    uint    x, y;

while(timeout && ( y = Ints.async_get()) == 0xff )
            timeout--;
    if( !timeout )
        return;
    timeout = 100000l;
    while(timeout && ( x = Ints.async_get()) == 0xff )
        timeout--;
    if( !timeout )
        return;
    scr_cursor_off();
        x -= ' ', y -= ' ';
    Ints.scr_pos = y * 80 + x;
    scr_cursor_on();
        }

//---------------------------------------------------------------- sinst

Term_tty[] =
    {
        { NULL,                                   NULL            }
    };

//****************************************************************
//*                       end of file                            *
//****************************************************************

//****************************************************************
//*                                                              *
//*                       RULES.HPP                              *
//*                                                              *
//*                  definitions of rules                        *
//*                                                              *
//****************************************************************
#ifndef     _RULES_HPP      //                                  *
#define     _RULES_HPP      //                                  *
//**************************************************************** class rule
```

```
{
public:

char area[ 2000 ];

rule    ( void ){ memset( area, 0, 2000 ); };
        ~rule   ( void ){};
    bin             affected( void );
    virtual void    execute ( void ){};
    void            cleanup ( void );
};

//------------------------------------------------------------ class rule1 : public rule
    {
    public:

rule1( void );
        void execute( void );
    };

//------------------------------------------------------------ class rule2 : public rule
    {
    public:

rule2( void );
        void execute( void );
    };

//------------------------------------------------------------ class rule3 : public rule
    {
    public:

rule3( void );
        void execute( void );
    };

//------------------------------------------------------------ class rule4 : public rule
    {
    public:
```

```
                    rule4( void );
        void execute( void );
    };

//---------------------------------------------------------------- class rule5 : public rule
    {
    public:

rule5( void );
        void execute( void );
    };

//****************************************************************
#ifdef    _RULES_CPP      //    global variables                  *
//**************************************************************** rule1          Rule1;
rule2          Rule2;
rule3          Rule3;
rule4          Rule4;
rule5          Rule5;
rule*          Rules[ 5 ] = { &Rule1, &Rule2, &Rule3, &Rule4,
&Rule5 };

else extern rule1       Rule1;
extern rule2       Rule2;
extern rule3       Rule3;
extern rule4       Rule4;
extern rule5       Rule5;
extern rule*       Rules[];

//****************************************************************
#endif    //              end of file                             *
#endif    //                                                      *
//****************************************************************

//****************************************************************
//*                                                               *
//*                    RULES.CPP                                  *
//*                                                               *
//*                                                               *
//*                                                               *
//****************************************************************
#define    _RULES_CPP      //                                     *
//**************************************************************** include  "rules.hpp"

//****************************************************************
//*              definitions of functions                         *
//****************************************************************
``` bin

```
    rule::affected( void )
    {
    for( int i = 0; i < 2000; i++ )
        if( area[ i ] && Ints.flags[ i ])
            return YES;
    return NO;
    }
```

//------------------------------------------------------------ bin

```
    rule::cleanup( void )
    {
    for( int i = 0; i < 2000; i++ )
        if( area[ i ] && Ints.flags[ i ])
            ( Ints.flags[ i ])--;
    }
```

//*************************************************************

```
    rule1::rule1( void )
    {
    // set to 1 the locations that belong to this rule's area
of sensitivity
    }
```

//------------------------------------------------------------ void

```
    rule1::execute( void )
    {
    //    execute all actions characteristic to this rule
    //    set Ints.done = YES if you want to request the end of
program
    }
```

//*************************************************************

```
    rule2::rule2( void )
    {
    // set to 1 the locations that belong to this rule's area
of sensitivity
    }
```

//------------------------------------------------------------ void

```
    rule2::execute( void )
    {
    //    execute all actions characteristic to this rule
    }
```

```
//************************************************************* rule3::rule3( void )
    {
    // set to 1 the locations that belong to this rule's area
of sensitivity
    }

//------------------------------------------------------------ void rule3::execute( void )
    {
    //    execute all actions characteristic to this rule
    }

//************************************************************* rule4::rule4( void )
    {
    // set to 1 the locations that belong to this rule's area
of sensitivity
    }

//------------------------------------------------------------ void rule4::execute( void )
    {
    //    execute all actions characteristic to this rule
    }

//************************************************************* rule5::rule5( void )
    {
    // set to 1 the locations that belong to this rule's area
of sensitivity
    }

//------------------------------------------------------------ void rule5::execute( void )
    {
    //    execute all actions characteristic to this rule
    }

//*************************************************************
//*                        end of file                        *
//*************************************************************
```

1. A system for interfacing at least one selected computer apparatus usable with a first display device to a selected display device that is different from the first display device, wherein the system is capable of receiving information from at least the selected apparatus for processing a displayable portion thereof, the system comprising:

an input port for receiving information from the selected apparatus wherein at least a portion of the information is intended to be displayed on the first device;

pre-processor means, coupled to said input port, wherein said means emulates, in part, the first display device;

a storage unit, coupled to said pre-processor means, with a first region having a predetermined storage capacity for storing displayable information received from said pre-processor means wherein said storage unit includes a second region, different from said first region, for storing a plurality of indicia indicative of at least one characteristic of said stored information;

means, coupled to said storage unit, for establishing a plurality of indicia in said second region; and processing means, coupled to said storage unit and responsive to said indicia, for modifying said stored information in order to display same on the selected display device.

2. A system as in claim 1 wherein said storage unit includes a third storage region, different from said first and said second regions, for storing a second plurality of indicia, different from said plurality of indicia, and wherein said processing means is responsive to said stored plurality and said second plurality of indicia.

3. A system as in claim 1 wherein said processing means includes a programmable computer to which the second display is coupled.

4. A system as in claim 1 wherein said displayable information is stored in the form of a virtual screen in the manner in which the information would be displayed.

5. A system for interfacing at least a first type of computer with a second type of computer comprising:

an input port for receiving information from the first type of computer;

pre-processor means coupled to said input port for communicating with the first type of computer;

a storage unit, coupled to said pre-processor means, with a first region having a predetermined storage capacity for storing information received from said pre-processor means wherein said storage unit includes a second region, different from said first region, for storing a plurality of indicia indicative of at least one characteristic of said stored information;

means, coupled to said storage unit, for establishing a plurality of indicia in said second region; and processing means, coupled to said storage unit and responsive to said indicia, for modifying said stored information before transferring same to the second type of computer.

6. A system as in claim 5 which includes a display device, coupled to said processing means, for displaying a representation of said stored, information as modified.

7. A system as in claim 5 wherein at least some of the information is displayable and is stored in said first region in a manner in which such information could be displayed.

8. A method for interfacing at least one selected computer to a second selected computer, different from the first computer, wherein the first computer sends information intended for receipt by a first output device but which is received by the second computer, the method comprising:

receiving the information from the first computer;

responding to the first computer so as to emulate, in part, the first output device;

providing a storage unit, with a first region having a predetermined storage capacity, for storing selected information received from the first computer wherein the storage unit includes a second region, different from said first region, for storing a plurality of indicia indicative of at least one characteristic of the stored information;

establishing a plurality of indicia in the second region; and modifying the stored information, in response to the plurality of indicia, for use with the second computer.

9. A method as in claim 8 which includes providing a third storage region, different from said first and said second regions, for storing a second plurality of indicia, different from said plurality of indicia, and using the stored plurality and the second plurality of indicia while modifying the stored information.

* * * * *